Aug. 17, 1937.        R. W. DINZL        2,090,475
HYDRAULIC MATERIALS TESTING MACHINE
Filed Aug. 16, 1935
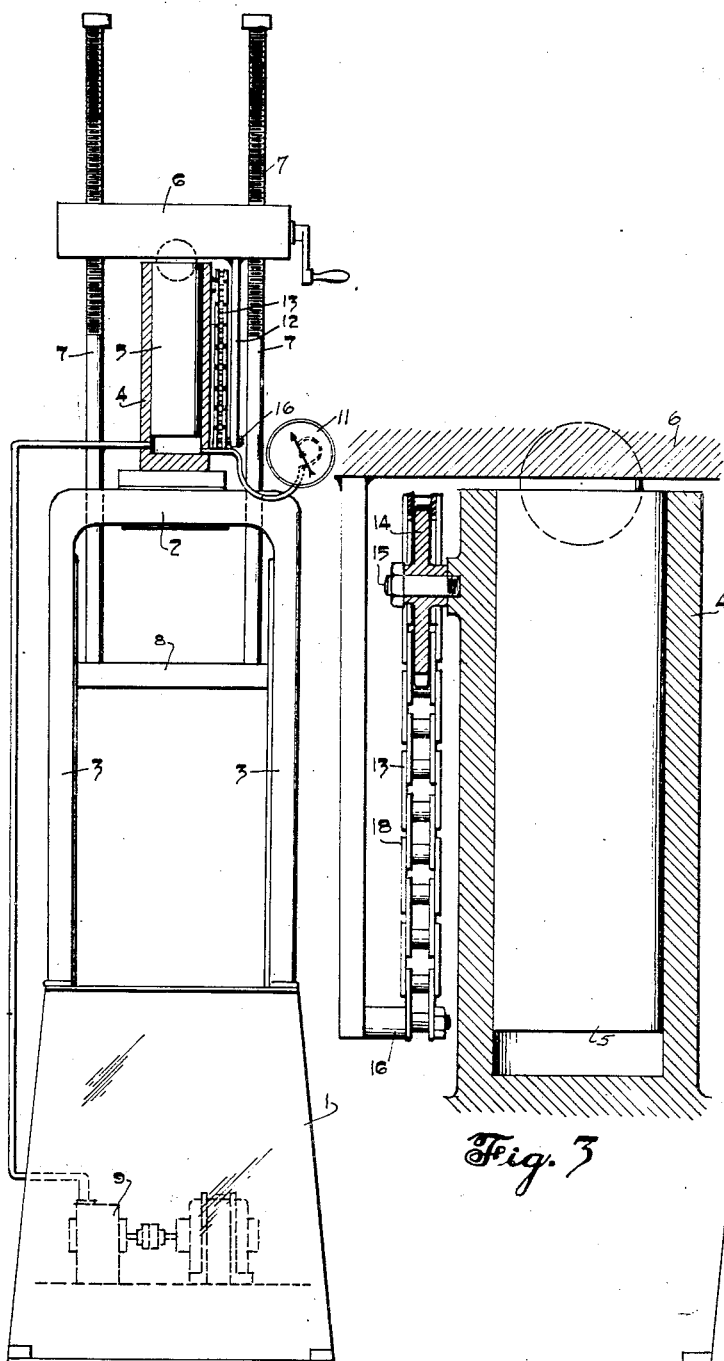
Fig. 1
Fig. 3
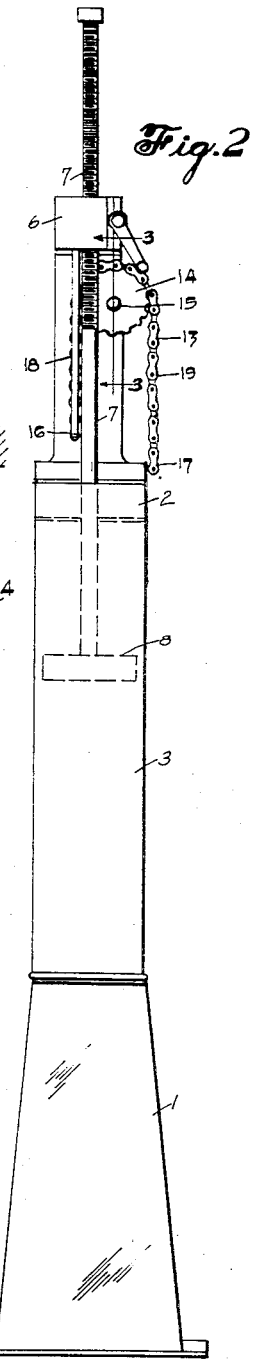
Fig. 2
INVENTOR
R. W. Dinzl
BY
Edward
ATTORNEY Patented Aug. 17, 1937

2,090,475

UNITED STATES PATENT OFFICE 2,090,475

HYDRAULIC MATERIALS TESTING MACHINE

Richard W. Dinzl, Narberth, Pa., assignor to Baldwin-Southwark Corporation, a corporation of Delaware Application August 16, 1935, Serial No. 36,486

6 Claims. (Cl. 265—14)

This invention relates generally to materials testing machines of the hydraulic type and more particularly to improved means for eliminating inaccuracies in the machine incident to variations in hydraulic head and buoyant effect in the hydraulic load producing ram and cylinder during vertical displacement of the ram.

It is highly desirable to eliminate all possible sources of error in determining the strength of materials and to this end materials testing machine manufacturers have long strived to obtain precision accuracy as nearly as possble. In hydraulic ram type materials testing machines, particularly of the vertical type, I now realize that the variable elevation of the ram is accompanied by a variable head of liquid beneath the ram and that this can introduce into the reading an appreciable error. Also, I now appreciate that as such a ram may intentionally or unintentionally have a certain amount of leakage along its cylindrical surface in order to minimize friction, there is the possibility of a variable buoyant effect upon the ram as it moves outwardly from its cylinder. It is customary to determine the load on a specimen by ascertaining the hydraulic pressure within the cylinder. Heretofore such pressure would have an inherent error due to the above-mentioned variable factors, these sources of error not having been heretofore appreciated or taken into consideration in the design of the machine.

It is one object of my invention to provide improved means to compensate for sources of errors incident to variable hydraulic conditions of the ram and cylinder, and more specifically to automatically compensate for the variable head and buoyancy, if any, incident to different positions of the ram. Another object is to provide a relatively simple and inexpensive but nevertheless sturdy and effective means for producing the foregoing automatic compensations so as to improve the precision qualities of the apparatus.

Other objects and advantages will be more apparent to those skilled in the art from the following description of the accompanying drawing in which:

Fig. 1 is a front elevation of a materials testing machine;

Fig. 2 is a side elevation thereof;

Fig. 3 is a partial sectional view taken on the line 3—3 of Fig. 2.

In the particular embodiment of the invention which is shown herein merely for the purpose of illustrating one specific form among possible others that the invention might take in practice, I have disclosed a materials testing machine which may be assumed to be of any conventional type. While various forms and types of machines together with a variety of arrangements of parts thereof my be employed, yet for purposes of illustration the specific machine shown comprises a base 1 having a stationary crosshead 2 supported upon standards 3. Mounted on top of crosshead 2 is a cylinder 4 in which is disposed a ram 5 carrying at its upper end a crosshead 6. This crosshead is adjustably secured to tension rods 7 whose lower ends carry a platen 8 which is suitably laterally guided by columns 3. The test specimen is inserted between platen 8 and crosshead 2 for a compression test and between platen 8 and base 1 for a tension test, it being understood that such elements are provided with usual grips or other auxiliary devices for suitably holding or supporting a test specimen. To apply load, fluid pressure is pumped from a pump 9 through a pipe 10 to the lower end of cylinder 4. To diagrammatically indicate that the load on a specimen is determined by measuring the pressure in cylinder 4, a pressure gauge 11 is shown as connected to this cylinder.

Secured to and depending from crosshead 6 is a vertical arm 12. A chain 13 preferably of the link type passes over a sprocket or pulley 14 which is journalled on cylinder 4 or on any other suitable stationary part of the machine for rotation about a fixed axis 15. One end of the chain is secured as at 16 to the lower end of arm 12 while the other end of the chain hangs freely as indicated at 17. There is thus provided two chain strands 18 and 19 respectively.

*Operation.*—As fluid pressure is pumped into the cylinder 4 through pipe 10 from pump 9, it is apparent that as the ram 5 moves upwardly the hydraulic pressure registered on the gauge is equal to the sum of the pressure required to load the specimen plus the head of oil in the cylinder above the level of the gauge. As this head of oil does not impose actual load on the specimen, it is seen that the gauge 11 will erroneously indicate the load. This head varies from substantially zero when the ram is at its lowermost position to a maximum when the ram is at its uppermost position. However, with my improved arrangement it is seen that when the ram is in its lowermost position the chain strands 18 and 19 are substantially balanced due to substantially equal lengths thereof. As the ram 5 moves upwardly, chain strand 18 becomes shorter and strand 19 becomes longer, thereby causing strand 19 to have increasingly greater weight than strand 18 and thus imparting an outward force on crosshead 6, which is the equivalent of the weight being imposed on ram 5. This additional chain weight thereby operates to automatically counteract the increased head within cylinder 4 with the result that the indicator 11 will register the true load on the specimen. As the ram is moved upwardly, e. g., to possibly accommodate different size specimens or to maintain load on the specimen during strain thereof, the pressure head within cylinder 4 likewise increases, but this is counteracted by the continual increasing weight of the strand 19. Conversely as the ram moves downwardly, the pressure head decreases and likewise the compensating weight of strand 19 decreases due to strand 18 lengthening and tending to balance strand 19.

In the event that there is either an intentional or unintentional amount of leakage between cylinder 4 and ram 5, so as to create a buoyant effect on the ram, it is seen that buoyancy will decrease as the ram moved upwardly, thus injecting a variable force on crosshead 6 which has heretofore been erroneously reflected in the load indication. However, with my improved chain, it is seen that as the ram moves upwardly, any decreased buoyant effect will be compensated for by the increased weight of strand 19 and vice versa as the ram 5 moves downwardly so as to have a greater buoyant effect. The buoyant effect is herein considered broadly to be a pressure condition.

From the foregoing disclosure it is seen that I have provided an extremely simple but yet highly effective means to compensate for variable positions of the movable ram 5, this compensation being entirely automatic and preferably by the creation of mechanical forces which can be determined to suit machines of various sizes and capacities. If desired for any reason, the weight of strand 19 may be augmented by a weight, but it is found in most instances that the variable weight of the chain itself in passing over the sprocket 14 is sufficient to effect the desired degree of compensation.

It will of course be understood that various changes in details of construction and arrangement of parts may be made by those skilled in the art without departing from the spirit of the invention as set forth in the appended claims.

I claim:

1. A materials testing machine comprising, in combination, relatively vertically movable hydraulic cylinder and ram elements for producing load on a specimen, load indicating means responsive to the pressure in said cylinder, and means automatically compensating for variations in hydraulic head within said cylinder upon occurrence of relative movement between the ram and cylinder.

2. The combination set forth in claim 1 further characterized in that said compensating means includes mechanism for imposing a variable mechanical force on the movable one of said ram or cylinder elements.

3. The combination set forth in claim 1 further characterized in that the compensating mechanism comprises a chain having two vertical strands hanging downwardly over opposite sides of a fixed axis, and means for moving one of said strands upwardly and the other strand downwardly or vice versa in accordance with the direction of movement between said ram and cylinder.

4. A materials testing machine comprising, in combination, means for loading a specimen including a cylinder and a hydraulically actuated vertically movable ram therein, load indicating means responsive to the pressure in said cylinder, and means for automatically compensating for the variable head of liquid within said cylinder caused by variable displacement of said ram.

5. The combination set forth in claim 4 further characterized in that said automatic compensating means comprises a sprocket mounted for rotation about a fixed axis, a chain supported on said sprocket and having strands hanging therefrom, and means for operatively connecting the lower end of one strand to said ram while the other end of said strand is free.

6. The combination set forth in claim 4 further characterized in that said compensating means has provision for operatively adding a compensating force to said ram during upward movement thereof and for decreasing said force during downward movement thereof.

RICHARD W. DINZL.